No. 609,354. Patented Aug. 16, 1898.
C. D. KEITH.
CORN PLANTER.
(Application filed May 7, 1898.)
(No Model.)
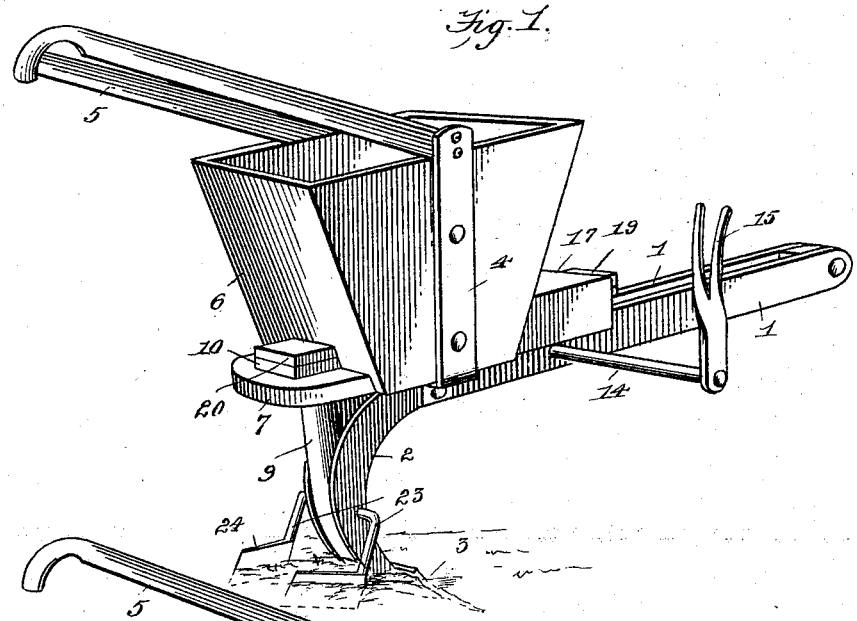
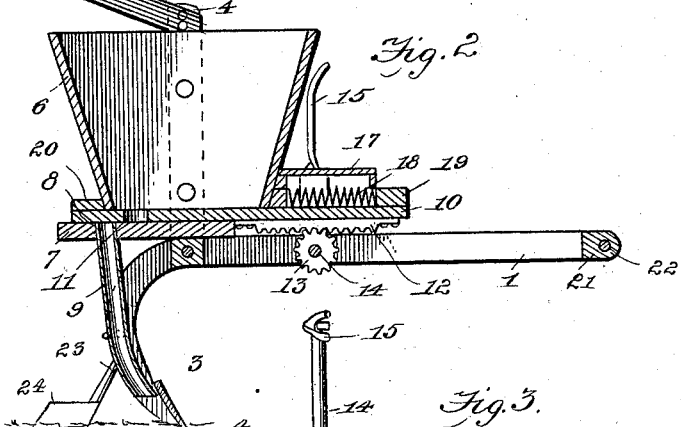
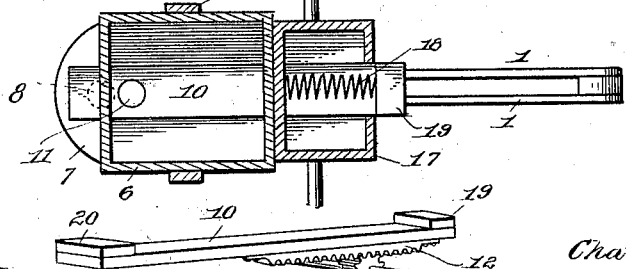
WITNESSES
INVENTOR
Charles D. Keith.
THE NORRIS PETERS CO., PHOTO-LITHO., WASHINGTON, D. C.

UNITED STATES PATENT OFFICE.

CHARLES DOUGLASS KEITH, OF CHEROKEE, ARKANSAS.

CORN-PLANTER.

SPECIFICATION forming part of Letters Patent No. 609,354, dated August 16, 1898.

Application filed May 7, 1898. Serial No. 680,017. (No model.)

*To all whom it may concern:*

Be it known that I, CHARLES DOUGLASS KEITH, a citizen of the United States, residing at Cherokee, in the county of Benton and State of Arkansas, have invented certain new and useful Improvements in Corn-Planters; and I do hereby declare the following to be a full, clear, and exact description of the invention, such as will enable others skilled in the art to which it appertains to make and use the same.

This invention relates to a single-row check-row corn-planter adapted for use in planting upon rough, rocky, and hard-baked land or upon a steep hillside, where it would be impracticable to use the double-row planter in common use.

It consists in a novel construction and arrangement of the parts of the planter, whereby the seed-dropping slide is connected with and adapted to be operated by a check-row arm upon either side of the planter for adapting the planter to be operated in either direction, according to the nature or character of the ground upon which the planter is to be used.

It will be fully understood from the following description and claims, reference being had to the accompanying drawings, in which—

Figure 1 represents a perspective view of the improved check-row planter. Fig. 2 represents a longitudinal vertical section through the same; Fig. 3, a horizontal section showing the bottom of the hopper in elevation, and Fig. 4 a detail perspective of the seed-dropping slide and its actuating rack-bar and pinion.

1 1 indicate parallel bars constituting the plow-beam and set at sufficient distances apart to accommodate between them a pinion for actuating said slides, as hereinafter explained. The rear ends of these beams are bent downward to form a standard 2, the lower ends of said standard being bent forward and having secured to them the shovel or plow 3.

4 4 indicate upright arms secured to the plow-beam bars at or near the standard portions thereof, these arms being angular in form and bent outward and upward and secured to the sides of the hopper and provided with suitable handles 5, similar to plow-handles, for guiding and controlling the operation of the plow.

6 indicates the hopper, made preferably with flaring sides in the usual manner and with the front and rear portions thereof preferably grooved to receive the flaring widened sides, to which the upright arms 4 are secured, as stated.

7 indicates the bottom plate of the hopper, extending in rear of the hopper and perforated near its rear end at 8 to receive the upper end of the seed-tube 9, which extends down between the standards 2 to a point directly in rear of the upper end of the plow or shovel 3 for depositing the grain immediately behind said shovel. The bottom plate 7 extends also in front of the hopper and is provided with a longitudinal vertical slot in alinement with the space between the bars of the plow-beam, as shown.

10 indicates the feed-slide, extending through the hopper immediately above the hopper-bottom, upon which it rests, said slide being provided with a pocket or perforation at 11, which serves to receive and gage the amount of corn to be carried out of the hopper by said slide at each rearward reciprocating movement thereof, and which movement is sufficient to carry the seed perforation, with its contents, directly over the opening receiving the seed-tube. The seed-slide extends forward of the hopper and is provided on its lower face with a toothed rack 12, adapted to engage a pinion 13, fast on a transverse shaft 14, mounted in bearings in the parallel bars 1. This shaft has its ends extended outwardly and is provided at each end with a fork 15, the arms of which are made flaring, as shown, adapting it to allow the check-row cord to pass through and at the same time to engage the knot thereon, which serves to carry the arm with which the cord engages rearward until the knot is allowed to slip from the fork. By this arrangement the shaft will be rocked for operating the seed-slide by each knot in quick succession in a manner that will be readily understood.

The forward end of the slide extends through a hood or cover 17, adapted to receive a spiral spring 18, which at one end abuts against the forward side of the hopper or an abutment thereon and at its opposite or forward end against a block or socket-piece 19, the arrangement being such that the tension of the spring is exerted always to retract or throw forward the seed-slide immediately the actuating-fork is released from the knot upon the cord, thereby bringing the seed-slide into position to be operated by the succeeding knot.

20 indicates a stop secured to the rear end of the seed-slide in rear of the seed-opening therein and which serves to limit the forward movement of the slide.

The forward ends of the beam-arms 1 are shown spaced by a suitable block 21 and a through-bolt 22, and to the latter any suitable clevis may be attached for the attachment of the draft animal or team. To the plow-standards at or near their junction with the shovel are secured arms 23, carrying covering-plates 24 of any suitable construction in rear of the shovel and of the seed-tube for covering the seed deposited through said tube.

The operation of the parts will be readily understood from the foregoing description.

Having now described the invention, what is claimed as new, and sought to be secured by Letters Patent, is—

1. In a single-row, check-row corn-planter, the combination with the parallel bars forming plow-beams and which are curved downward at their rear ends to form the standard, of the transverse shaft journaled therein, the pinion fast on said shaft intermediate said bars, the seed-dropper slide provided with a pendent rack engaging and operated by said pinion, and a fork-arm on said shaft for actuating said pinion and slide, substantially as described.

2. In a single-row check-row corn-planter, the curved parallel bars constituting the plow beam and standard, in combination with a pinion for actuating the seed-dropper slide arranged between said bars upon a transverse shaft journaled in said bars and carrying a forked arm to be actuated by the knot in the cord or wire, the seed-dropper slide provided with a pendent rack adapting it to be actuated by said pinion, and a spring for retracting said rack, substantially as described.

3. In a single check-row corn-planter, the combination with the parallel bars forming the plow-beam, of the upright arms to which the plow-handles are attached, the seed-hopper secured intermediate said arms, the slotted hopper-bottom perforated to receive the seed-tube, the tube connected with said hopper-bottom and extending down between the plow-standards, the seed-slide moving over said bottom and provided with a perforation adapted to measure the quantity of seed to be deposited at each throw of the slide, a pendent rack-bar secured to the forward end of the seed-slide and engaging a pinion fast on the transverse shaft journaled in the plow-beam, the forked arms on said shaft adapted to be operated by the knotted cord or wire, and a spring for retracting said arms and the seed-slide when released from a knot on said cord, substantially as described.

4. In a single-row check-row corn-planter, the combination with the parallel and curved bars forming the plow beam and standard, of the slotted hopper-bottom, the seed-tube connected therewith to extend down between the pendent arms forming the standards of said plow-beam, the perforated seed-slide moving on said slotted hopper-bottom and provided with a mechanism for actuating it adapted to be operated by the check-row cord, stops on said slide for limiting its longitudinal movement, and a spring for retracting said slide after the same has been operated upon by the check-row cord, substantially as described.

In testimony whereof I affix my signature in presence of two witnesses.

CHARLES DOUGLASS KEITH.

Witnesses:
CHARLES STOOPS,
JAMES R. BEADLES.